United States Patent [19]

Temme

[11] Patent Number: 4,505,379
[45] Date of Patent: Mar. 19, 1985

[54] SCRAPERS FOR SCRAPER-CHAIN CONVEYORS

[75] Inventor: Helmüt Temme, Waltrop, Fed. Rep. of Germany

[73] Assignee: Gewerkschaft Eisenhutte Westfalia, Lunen, Fed. Rep. of Germany

[21] Appl. No.: 442,327

[22] Filed: Nov. 17, 1982

[30] Foreign Application Priority Data

Nov. 27, 1981 [DE] Fed. Rep. of Germany ....... 3147076

[51] Int. Cl.$^3$ .............................................. B65G 19/24
[52] U.S. Cl. .................................... 198/731; 198/734; 198/494
[58] Field of Search ................ 198/731, 734, 494, 498

[56] References Cited

U.S. PATENT DOCUMENTS 2,034,876 3/1936 Morgan .......................... 198/494 X
2,372,925 4/1945 Ball ..................................... 198/734
2,757,784 8/1956 Von Stroh et al. ................. 198/731

FOREIGN PATENT DOCUMENTS 1531973 6/1980 Fed. Rep. of Germany .

Primary Examiner—Joseph E. Valenza
Assistant Examiner—Stuart J. Millman
Attorney, Agent, or Firm—Sughrue, Mion, Zinn, Macpeak and Seas

[57] ABSTRACT

A scraper-chain conveyor has a scraper-chain assembly composed of a pair of outboard chains with scapers therebetween. The assembly passes along upper and lower runs and the lower run is enclosed. Each scraper has an upstanding front face and a lower foot face perpendicular thereto. The foot face slides along a floor of the conveyor and a scraping edge between the front and lower faces transfers material in the upper run. To prevent fine material building up in the lower run, the scraper has a further scraping edge formed between the front face and an upper face generally parallel to the lower face. This further scraping edge slides along the base of the lower run.

10 Claims, 4 Drawing Figures

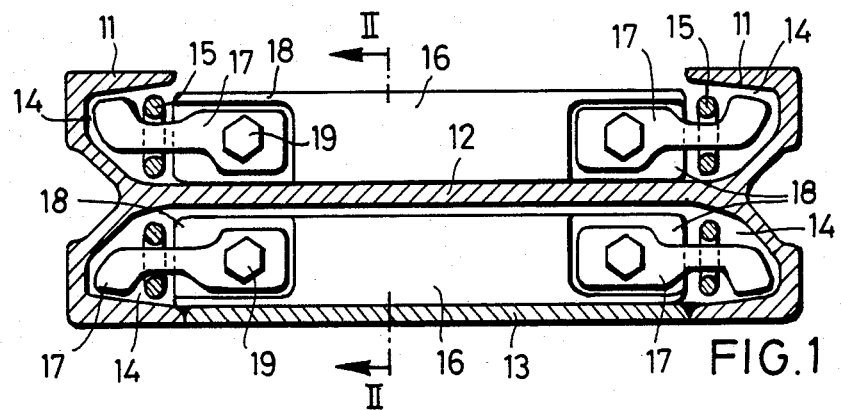
FIG.1
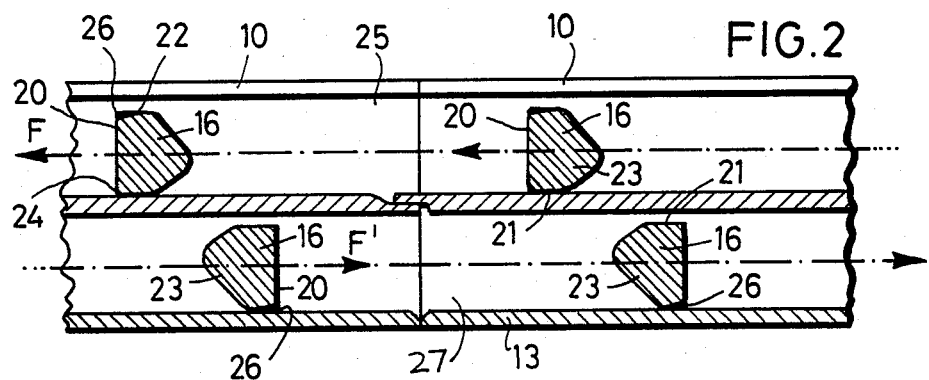
FIG.2
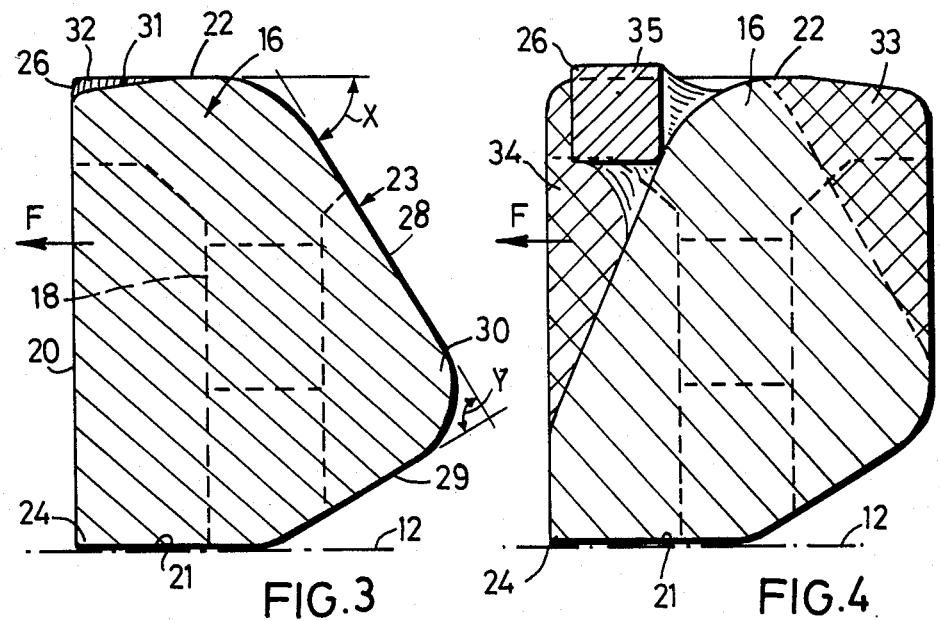
FIG.3
FIG.4

SCRAPERS FOR SCRAPER-CHAIN CONVEYORS

BACKGROUND OF THE INVENTION

The present invention relates in general to scraper-chain conveyors used in mining and, more particularly, to scrapers therefor.

It is well known to construct scraper-chain conveyors from a series of pans joined together end-to-end and a scraper-chain assembly which circulates along the pans. The scrapers are normally shaped to possess a scraping edge which slides along a floor of the conveyor to transfer material in an upper run of the conveyor. The scrapers then return along a lower run beneath the floor. The lower run can be open to the floor of the mine working or enclosed. A one-piece drop-forged scraper is described in German patent specification No. 1531973. This scraper has a scraping edge formed at the junction between a lower face which slides over a conveyor floor, separating an upper run of the conveyor from a lower run, during use, and a front face.

Where the lower run is enclosed there is a danger that fine material can build up and disable the conveyor. A general object of this invention is to provide an improved scraper for a scraper-chain conveyor.

SUMMARY OF THE INVENTION

In accordance with the invention, the scraper has a further scraping edge at the upper region of the front face. This further scraping edge, which can be formed at the junction between an upper face and the front face, then slides over base plate means of the conveyor closing off the lower run of the conveyor to remove the fine material. The upper face can be parallel to the lower face and perpendicular to the front face.

In contrast to the known scrapers, a scraper according to the present invention has two definite scraping edges. The edges can both be formed by merging portions of the faces which stand at right angles practically without rounding-off. The scraper can be drop-forged as is known. It is desirable to match the weight and resistance moment of known scrapers, inter-alia for interchangeability. The rear of the scraper can be relieved to achieve this. The front face can extend over the entire height of the scraper while the rear of the scraper opposite this front-face can be formed by two surfaces which extend at an angle to one another and merge over a region shaped as a curvilinear dorsal bead. These surfaces preferably extend at an angle of 80° to 100°, say 85° to 95°, relative to one another and the upper surface preferably extends at 45° to 65°, say 50° to 60°, relative to a plane containing the lower face. Welded-on strips inserts, reinforcements or the like can be secured to the support face to define the further scraping edge.

The invention may be understood more readily, and various other features and aspects of the invention may become apparent, from consideration of the following description.

BRIEF DESCRIPTION OF DRAWING

Embodiments of the present invention will now be described, by way of example only, with reference to the accompanying drawing:

FIG. 1 is a cross-sectional view of a scraper-chain conveyor employing scrapers constructed in accordance with the present invention;

FIG. 2 is a sectional side view of the conveyor shown in FIG. 1, the view being taken along the line II—II of FIG. 1;

FIG. 3 is a cross-sectional view of one of the scrapers of the conveyor, the view being taken on a somewhat larger scale than that of FIGS. 1 and 2; and FIG. 4 is a view similar to FIG. 3 but constituting a cross-sectional view of a modified form of scraper.

DESCRIPTION OF PREFERRED EMBODMENTS

As is known, a conveyor constructed in accordance with the invention is composed of a series of channel sections or pans arranged end-to-end and along which is circulated a scraper-chain assembly. The individual pans are designated 10 in FIGS. 1 and 2. The pans 10 are interconnected at their ends as is known to permit slight angular mobility in both horizontal and vertical planes while resisting traction forces. Each pan 10 is composed of two generally sigma-shaped side walls 11 joined together usually by welding, by way of a floor plate 12. The side walls 11 and the floor plates 12 of the pans 10 combine to produce upper and lower passages or runs for the associated scraper-chain assembly. The lower run of each pan is closed off by way of a base plate 13 welded between the lower flanges of the side walls 11 as shown in FIG. 1.

The scraper-chain assembly depicted in FIGS. 1 and 2 is of the outboard type where the chains are disposed near the side walls 11 of the pan 10. The chains, designated 15 in FIG. 1 are connected to individual scrapers 16 spaced apart along the longitudinal direction of the conveyor by means of locking devices 17. These locking devices 17 pass through vertical links of the chain 15 and have outer shaped portions disposed within guideways 14 defined by the inside of the side walls 11. The locking devices 17 are detachably secured to the scrapers 16 with the aid of nuts and bolts 19.

The scrapers 16 themselves are one-piece components formed preferably by drop-forging. The scrapers are relieved or cut away at their ends to form T shaped end portions designated 18 in FIGS. 1, 3 and 4. The locking devices engage with the upstanding region of the T shaped portions 18 and these regions have bores receiving the bolts 19. The locking devices 17 engage with two upstanding links of the chain 15 to effectively replace one of the horizontal links thereof. This general construction for the scraper-chain conveyor is known, for example, from German pubilshed specification No. 1531973. In accordance with the present invention the scrapers 16 are shaped as described hereinafter to perform scraping operations in both the upper and lower runs of the scraper-chain assembly.

FIG. 3 depicts one shape for the scrapers as a cross-section through the scraper intermediate the end regions 18. The arrow F in FIG. 3 indicates the direction that the scraper 16 travels in when it is in the upper run of the conveyor. As shown in FIG. 3, the scraper has a front upstanding face 20 which extends substantially perpendicularly to the upper surface of the floor plate 12 providing the floor of the conveyor. The scraper has a flat lower face 21 substantially perpendicular to the front face 20, a top face 22 generally parallel to the face 21 and a rear part 23. The juncture between the front face 20 and the lower face 21 of the scraper forms a first distinct scraping edge 24 and during operation when the scraper-chain assembly circulates along the pans 10 the scrapers 16 slide with their bottom faces 21 in contact with the floor plates 12 over the upper run 25 of the scraper-chain conveyor. This can be seen in FIGS. 2 and 3. During this operation the scraping edge 24 transfers material along on the floor plates 12. In accordance with the invention, the upper face 22 also merges with the front face 20 over a juncture region which forms a further scraping edge 26. This scraping edge 26 comes into effect when the scraper 16 is passing through the lower run 27 of the conveyor as shown in FIG. 2. Although the upper face 22 can be curvilinear it extends substantially parallel to the face 21 and meets the face 20 over a juncture region which forms the scraping edge 26 at an angle of nearly 90°. As shown in FIG. 3 the rear part 23 of the scraper 16 is formed from two inclined surfaces 28, 29 which merge over a curved dorsal bead region 30. The angle X between the upper inclined face 28 and the top face 22 is preferably in the region 50° to 60°, say 55°. The angle Y formed between the upper rear inclined surface 28 and the lower rear inclined surface 29 is preferably in the range 85° to 95°, say 90°.

A scraper constructed in accordance with the teachings of this invention has approximately the same weight and strength and resistance moment as known scrapers. As shown in FIG. 3, and for reasons in connection with the forging process, it may be appropriate to further round off the upper face 22 in its transition with the front face 20 or even to impart a light concavity as shown at 31 in FIG. 3. In order to provide the distinct scraping edge 26, however, an added-on portion 32 of welded metal can be applied in the zone between the faces 22 and 20. A small sharp edge metal strip can also be welded across the upper region of the scraper to provide the scraping edge 26.

FIG. 4 depicts another embodiment of the invention in which like reference numerals denote like parts to FIG. 3. The basic shape of the scraper 16, shown in cross hatched lines, corresponds with that of German specification No. 1531973. To modify the scraper in accordance with the invention a substantial block 34 of wear-resistant material, shown in double-hatching, is welded in between the end portions 18 of the scraper and an additional square-section metal strip 35 forms the scraping edge 26. This added-on portion 34 is preferably matched by the removal of material from the rear as shown by double-hatched lines designated 33.

I claim:

1. In a scraper-chain conveyor for mineral mining of the type wherein a scraper-chain assembly is driven along upper and lower runs defined by side walls and floor plates of individual pans joined end-to-end and the lower run is closed off by means of base plates; improved scrapers (16) for the scraper-chain assembly each comprising a one-piece solid component with shaped end regions (18) for securing to chains (15) of the scraper-chain assembly and a central working region with an upstanding front face (20) relative to said floor plates (12) which defines the height of the scraper, a flat lower face (21) for sliding along the floor plates, the front and lower faces extending substantially perpendicular to one another to define a first scraping edge (24) where said faces meet, an upper face (22) at least part of which is substantially parallel to the lower face and extends over a similar area to the lower face, the upper face serving for sliding along the base plates (13), the upper and front faces (20, 22) also extending substantially perpendicular to one another, a second scraping edge (26) defined at or near a juncture of the front and upper faces, and upper and lower rear faces (28, 29) which extend at an angle to and merge with the upper and lower faces respectively to relieve a rear side (23) of the scraper; whereby the scrapers transport bulk material along the floor plates with their first scraping edges (24) in the upper run (25) and the scrapers transport fine material along the base plates in the lower run (27) with the second scraping edges (26).

2. A conveyor according to claim 1, wherein the upper and lower rear faces (28, 29) of each scraper merge over a region shaped as a curvilinear bead (30).

3. A conveyor according to claim 1, wherein the upper rear face (28) of each scraper is inclined at an angle of about 45° to 65° relative to a horizontal plane containing the lower face (21).

4. A conveyor according to claim 1, wherein the upper rear face (28) of each scraper is inclined at an angle of about 50° to 60° relative to a horizontal plane containing the lower face (21).

5. A conveyor according to claim 1, wherein the upper and lower rear faces (28, 29) of each scraper extend at an angle of about 80° to 100° relative to one another.

6. A conveyor according to claim 1, wherein the upper and lower rear faces (28, 29) of each scraper extend at an angle of about 85° to 95° relative to one another.

7. A conveyor according to claim 1, wherein the upper scraping edge (26) of at least one of the scrapers is formed between the front face (20) and a separate portion (32) fixed integrally to an upper region of the scraper.

8. A conveyor according to claim 7, wherein the separate portion is a welded-on strip (32).

9. A conveyor according to claim 1, wherein a block (34) of wear-resistant material is welded between the end regions (18) of at least one of the scrapers to provide the front face (20) and at least part of the upper face (22) and an additional strip (35) carried on the block (34) defines the upper scraping edge (26) offset from the front face (20).

10. A conveyor according to claim 1, wherein the upper scraping edge (26) is defined by the upper and front faces (20, 22).

* * * * *